M. NEFT.
KNIFE.
APPLICATION FILED JULY 8, 1921.
1,428,296.
Patented Sept. 5, 1922.
2 SHEETS—SHEET 1.
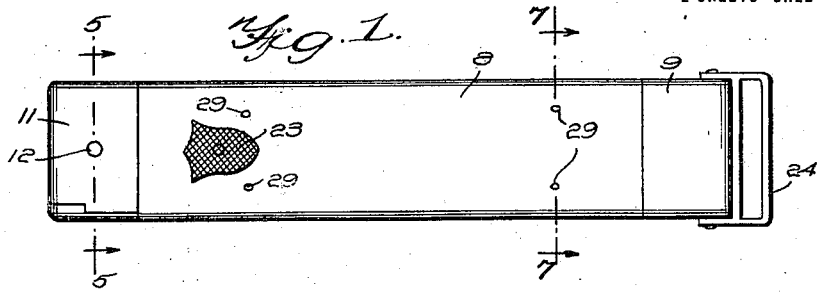
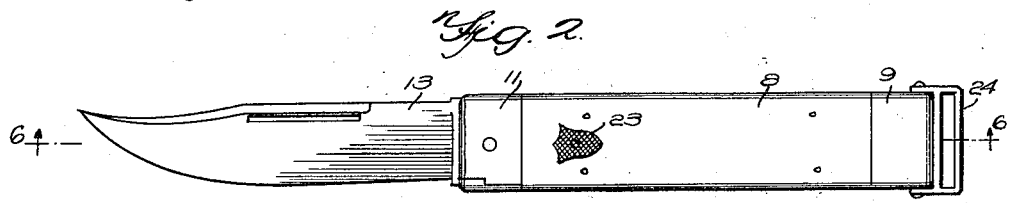
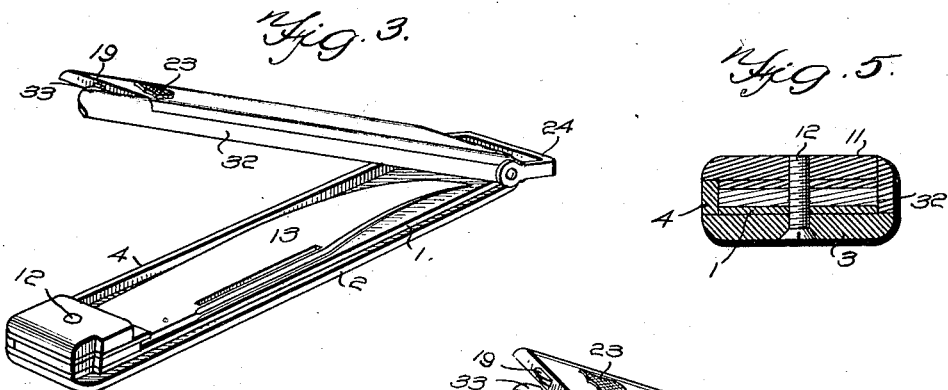
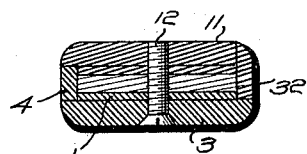
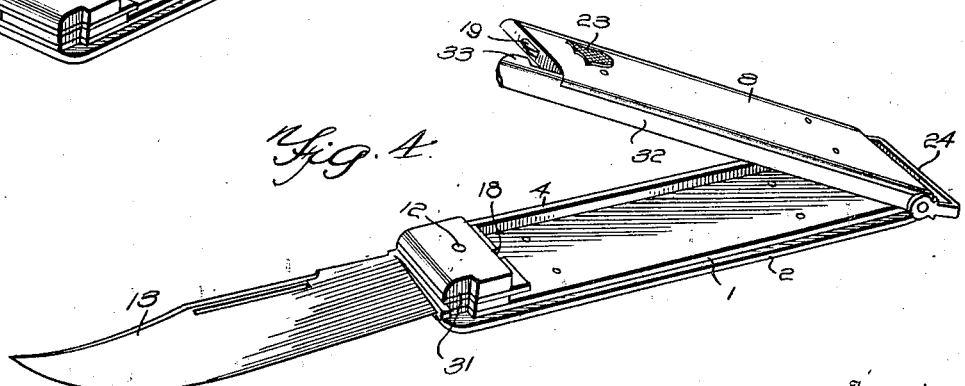
Inventor
Max Neft
By Ch. Parker
Attorney

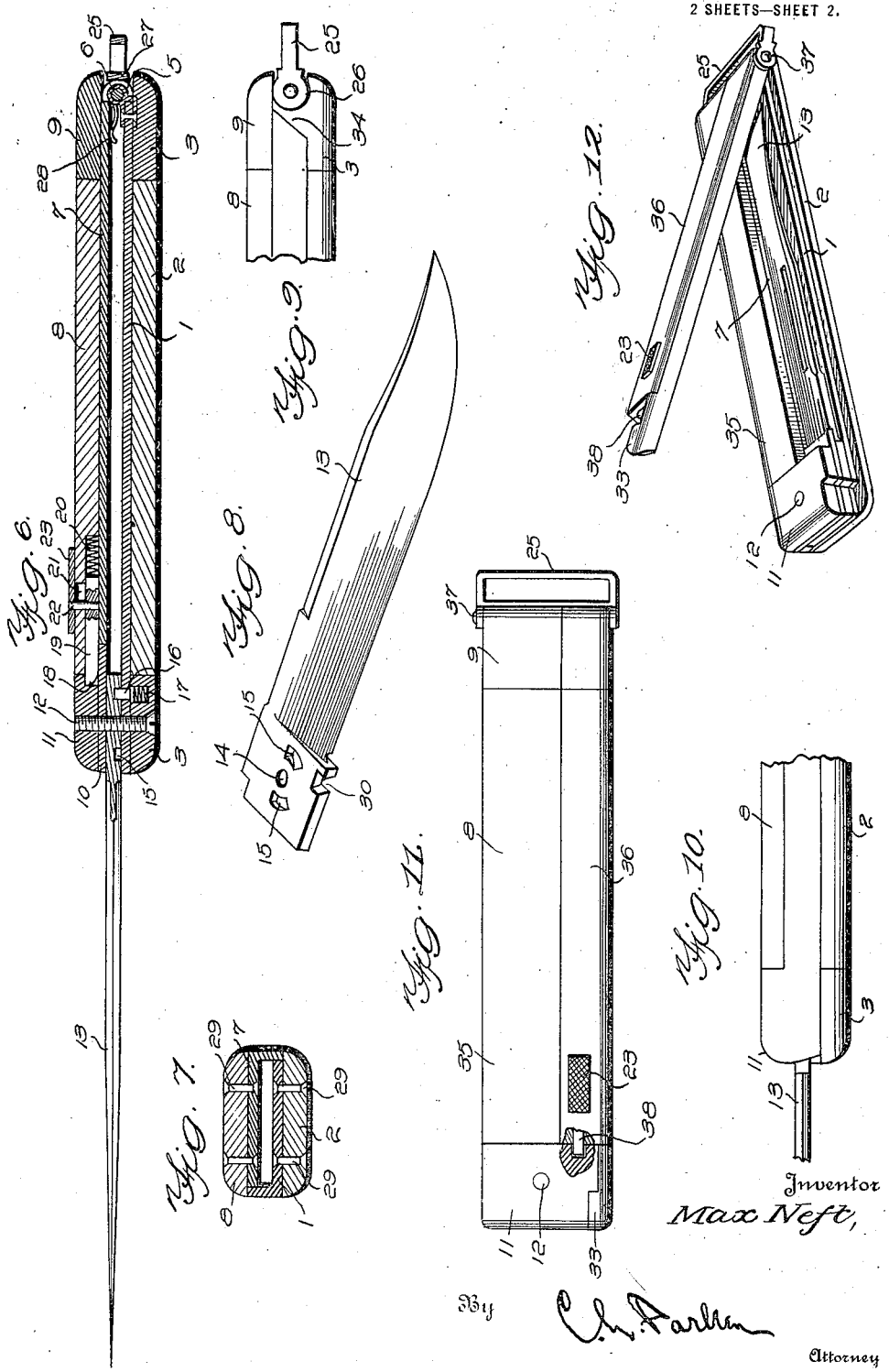

Patented Sept. 5, 1922.

1,428,296

UNITED STATES PATENT OFFICE.

MAX NEFT, OF SEATTLE, WASHINGTON.

KNIFE.

Application filed July 8, 1921. Serial No. 483,287.

*To all whom it may concern:*

Be it known that I, MAX NEFT, a citizen of the United States, residing at Seattle, in the county of King and State of Washington, have invented certain new and useful Improvements in Knives, of which the following is a specification.

This invention relates to knives, and is an improvement over the construction shown in my prior Patent No. 1,358,097.

As in my prior patent, I have provided a knife in which the blade is concealed within the body when not in use. In the prior construction, the knife comprises a casing plate, a blade pivotally secured thereto to swing in a plane parallel to the plane of the blade, and a complementary casing plate pivotally secured to said first named plate and swinging in a plane at right angles to the blade. The complementary plate is provided with outstanding flanges adapted to engage the shank of the blade to retain it in open and closed positions.

In the present invention, I provide a knife having a casing plate, a blade, and a complementary casing, as in the prior construction. In the present construction, however, one of the side flanges is carried by the casing plate and is adapted to position the blade in proper position when the blade is arranged within the body and limit its inward movement.

I have further provided an improved support for the blade pivot carried by the casing plate and extending above and below the blade.

In the accompanying drawings, I have shown several embodiments of the invention. In this showing:

Figure 1 is a plan view of the knife in closed position,

Figure 2 is a similar view with the blade in open position,

Figure 3 is a perspective view showing the complementary casing section in open position and the blade in closed position, Figure 4 is a similar view showing the complementary casing section in open position and the blade in open position, Figure 5 is a transverse sectional view on line 5—5 of Figure 1, Figure 6 is a longitudinal sectional view on line 6—6 of Figure 2, Figure 7 is a transverse sectional view on line 7—7 of Figure 1, Figure 8 is a perspective view of the blade detached, Figure 9 is a side elevation of one end of the knife, Figure 10 is a similar view of the other end of the knife from the opposite side, Figure 11 is a plan view of a modified form, and, Figure 12 is a perspective view of the form shown in Figure 11 showing the complementary casing section in open position.

Referring to Figures 1 to 10 of the drawings, the reference numeral 1 designates the main casing plate, which may be formed of metal or other suitable material, and is provided with the usual hand grip 2 formed of wood or suitable composition. Metal blocks 3 extending outwardly to form a continuation of the hand grip are provided at opposite ends of the casing plate. The casing plate is provided with a longitudinal flange 4, formed on one side. Secured to one end of the casing plate, there is provided a hinged member 5 adapted to receive a pin 6, carried by the complementary casing section 7. The complementary casing section comprises a plate of metal or other suitable material similar to the main casing plate, having a grip 8 of wood or suitable composition secured thereto. A metal block 9 is arranged at the rear end of the complementary casing section. The forward end of the complementary casing section terminates inwardly of the end of the main casing section. As shown, a metal plate 10 is arranged above the forward end of the main casing section and this plate is adapted to form a continuation of the complementary casing section when the knife is in closed position (see Figure 6). A metal block 11 is arranged above this plate, the block being adapted to lie flush with the grip 8.

A pivot pin 12 is mounted in the forward end of the main casing section, and this pin is adapted to receive a knife blade 13, having an opening 14 for the passage of the pin. The blade is provided with a pair of inclined recesses or depressions 15, adapted to receive a pin 16 mounted in the main casing plate and normally retained in projected position by means of a spring 17.

The block 11 is provided with a recess 18, adapted to receive a locking pin 19, carried by the complementary casing section. As shown, the locking pin is normally retained in projected positon by means of a coil spring 20. The grip 8 is provided with an elongated slot 21, through which passes a pin 22, secured to the locking pin. A handgrip 23 is secured to this pin to permit release of the locking pin.

A handle 24 is arranged on the pivot pin 6, connecting the two sections of the casing, the handle being provided with arms 25 having enlarged ends 26 in which openings are formed for the passage of the pivot pin. As shown in Figure 6 of the drawings, the handle is provided with a transverse member 27, arranged in alinement with the end of the casing. When the locking pin 19 is released and the complementary casing section moved to open position, the transverse member engages the two sections and limits the movement of the complementary section to the position shown in Figures 3 and 4 of the drawings. A spring is arranged on the pivot pin 6 and is provided with a projecting end 28 which moves the complementary casing section to open position when the locking member is released.

The grips 2 and 8 are secured to the casing plates 1 and 7 in any suitable manner, as by means of rivets 29. The butt of the blade is provided with a recess 30, adapted to aline with a cut-out portion 31 formed in the forward end of the main casing section. The complementary casing plate is provided with a longitudinal flange 32, similar to the flange of the main casing plate and arranged on the opposite side. This flange extends forwardly beyond the end of the complementary casing section to the end of the casing. As shown, it is provided with an enlargement 33 at its forward end, adapted to be received in the cut-out portion 31 and enter the recess or notch 30 of the blade to fully open the blade when in use. Adjacent the rear end of the knife on the side opposite to that from which the blade is removed, the flange 4 of the main casing section is cut away and the complementary casing section is provided with a flange 34, extending into this space and adapted to receive the pivot pin 6.

In the modification shown in Figures 11 and 12 of the drawings, the construction is essentially the same, except that the complementary casing section is split longitudinally or formed in two parts. The section 35 formed opposite to the side at which the blade opens, is secured to the main casing section and spaced therefrom to permit the blade to be arranged within the casing. The section 36 is pivotally mounted on the pivot pin 37 and is provided with a locking pin 38.

In the use of the knife, with the parts in the position shown in Figure 1 of the drawings, the locking pin is disengaged from the recess 18 by moving the plate 23 toward the rear of the casing. As shown, the plate may be knurled to facilitate operation. As soon as the locking pin 19 is disengaged from the main casing section, the end 28 of the spring arranged around the pivot pin moves the complementary casing section on its pivot. This movement of the complementary casing section is limited by the transverse member 27 to the position shown in Figures 3 and 4 of the drawings. With the complementary casing section in open position, the blade may be removed from the casing. The inclined recesses 15 are arranged 180 degrees from each other, and the pin 16 is adapted to enter each of the recesses as the blade is turned on its pivot and retain it in proper position. The provision of a pivot support which extends above and below the blade is advantageous and holds the blade more firmly in position. When the blade is moved to open position, if it is not properly alined, the enlargement 33 on the end of the flange 32 engages the recess 30 when the complementary casing section is closed to properly position the blade. When the blade is closed, the movement about the pivot is limited by the flange 4, preventing it from being swung beyond its proper point within the casing.

In the form of the invention shown in Figures 11 and 12 of the drawings, the operation is essentially the same. However, when the complementary casing section is open, the portion adjacent the side through which the blade is to be removed is moved to the open position, as shown in Figure 12 of the drawings, and the blade grasped by the fingers and swung on its pivot.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A knife comprising a main casing plate and a complementary casing plate hinged thereto to swing in a plane at right angles to the plane of said plate, said complementary casing plate being shorter than said main casing plate, an auxiliary plate mounted on said main casing plate in alinement with said complementary casing plate, and adapted to form a continuation thereof when the casing plate is in closed position, said casing plates being provided with longitudinal flanges arranged on opposite sides and adapted to form the sides of the casing, a pivot pin extending through said auxiliary plate and said main casing plate, and a blade mounted on said pivot pin between said auxiliary plate and said main casing plate, said blade being adapted to swing 2. A knife comprising a main casing plate and a complementary casing plate hinged thereto to swing in a plane at right angles to the plane of said plate, said complementary casing plate being shorter than said main casing plate, an auxiliary plate mounted on said main casing plate in alinement with said complementary plate and adapted to form a continuation thereof when the complementary plate is in closed position, said casing plates being provided with flanges arranged on opposite sides and adapted to form the sides of the casing, the flange carried by the complementary casing plate being equal in length to the main casing plate and extending along said auxiliary plate, a pivot pin passing through said auxiliary plate and said main casing plate, and a blade mounted on said pin and arranged between said casing plate and said auxiliary plate.

3. A knife comprising a main casing plate and a complementary casing plate hinged thereto to swing in a plane at right angles thereto, said complementary casing plate being shorter than said main casing plate, an auxiliary plate mounted on said casing plate in alinement with said complementary casing plate and adapted to form a continuation thereof when said complementary casing plate is in closed position, said casing plates being provided with flanges arranged on opposite sides and adapted to form the sides of the casing, the flange carried by said complementary casing plate being equal in length to the main casing plate and extending along said auxiliary plate, a pivot pin passing through said block and said main casing plate, a blade mounted on said pin and arranged between said auxiliary plate and said main casing plate, and means carried by the extended end of said flange of the complementary casing plate to properly position the blade when the blade is open.

In testimony whereof I affix my signature in presence of two witnesses.

MAX NEFT.

Witnesses:
  GEO. F. BRELSFORD,
  HY BARNES.